United States Patent
Livingston et al.

(10) Patent No.: US 7,482,927 B2
(45) Date of Patent: Jan. 27, 2009

(54) SURVEILLANCE AND ALERTING SYSTEM AND METHOD

(75) Inventors: James Livingston, Hickory Creek, TX (US); Kenneth J. Lovegreen, Lake Kiowa, TX (US); Russell P. Blink, Plano, TX (US)

(73) Assignee: Long Range Systems, Inc., Addison, TX (US)

( * ) Notice: Subject to any disclaimer, the term of this patent is extended or adjusted under 35 U.S.C. 154(b) by 231 days.

(21) Appl. No.: 11/325,853

(22) Filed: Jan. 5, 2006

(65) Prior Publication Data

US 2007/0152810 A1 Jul. 5, 2007

(51) Int. Cl.
*G08B 13/14* (2006.01)
(52) U.S. Cl. ............... 340/572.1; 340/572.4; 340/521; 340/531; 340/286.06; 340/286.09; 340/539.1; 340/541; 382/103; 382/276; 705/15; 705/16; 705/26; 705/27
(58) Field of Classification Search ............ 340/572.1, 340/572.4, 572.8, 521, 531, 286.06, 286.09, 340/539.1, 541; 348/143, 152, 153; 382/103, 382/276; 725/105; 705/15, 16, 26, 27
See application file for complete search history.

(56) References Cited

U.S. PATENT DOCUMENTS

| | | | | |
|---|---|---|---|---|
| 5,168,354 A | * | 12/1992 | Martinez et al. | 348/150 |
| 5,907,275 A | * | 5/1999 | Battistini et al. | 240/286.09 |
| 6,658,091 B1 | * | 12/2003 | Naidoo et al. | 379/37 |
| 2002/0170064 A1 | * | 11/2002 | Monroe et al. | 725/105 |
| 2003/0061621 A1 | * | 3/2003 | Petty et al. | 725/105 |
| 2004/0086452 A1 | * | 5/2004 | Seol et al. | 423/598 |

* cited by examiner

*Primary Examiner*—Tai T Nguyen
(74) *Attorney, Agent, or Firm*—Steven W. Smith

(57) ABSTRACT

A combination surveillance and alerting system and method in a restaurant that serves take-out customers. A video camera monitors a parking space for take-out customers, and sends video to an image recognition program, which detects when a vehicle enters the parking space. The detection triggers a controller to start a timer and instruct an on-premises paging transmitter to page an employee responsible for serving take-out customers. The image recognition program detects when the employee enters a greeting zone for greeting customers, and the controller prepares an elapsed greeting time report for management. The image recognition program also detects when the vehicle leaves the parking space, and the controller prepares a total service time report for management.

19 Claims, 2 Drawing Sheets

SURVEILLANCE AND ALERTING SYSTEM AND METHOD

BACKGROUND OF THE INVENTION

1. Technical Field of the Invention

This invention relates to surveillance systems and, more particularly, to a combination surveillance and alerting system and method of managing a surveillance area by paging an individual when a triggering event occurs in the surveillance area.

2. Description of Related Art

In the restaurant industry, many restaurants provide a takeout service for customers who desire to pick up food and take it home. Many restaurants have reserved parking spaces for takeout customers. Generally, takeout customers are required to enter the restaurant and order their food from a takeout counter. A problem arises when restaurant employees are busy with other customers, and do not notice that the takeout customer is present.

What is needed in the art is a system and method that overcomes the deficiencies of existing practices with regard to takeout customers. The present invention provides such a system and method.

SUMMARY OF THE INVENTION

In one aspect, the present invention is directed to a combination surveillance and alerting system. The system includes means for monitoring a surveillance area; means connected to the monitoring means for detecting that a triggering event has occurred in the surveillance area; and means responsive to the detecting means for alerting an individual in response to detecting that the triggering event has occurred. In one embodiment, the system is installed at a restaurant and is operable to monitor one or more parking spaces for takeout customers. When the system detects that a vehicle has entered a takeout parking space, the system pages an employee so that the employee can serve the takeout customer.

In another aspect, the present invention is directed to a combination surveillance and alerting system in a restaurant that serves takeout customers. The system includes a video camera for monitoring a parking space for the takeout customers; an image recognition program connected to the video camera for detecting that a vehicle has entered the parking space; and an on-premises paging transmitter for paging an employee in response to detecting that the vehicle has entered the parking space. The system may also include a timer and a controller connected to the image recognition program, the paging transmitter, and the timer. The image recognition program reports to the controller that a vehicle has entered the parking space, and the controller starts the timer and instructs the paging transmitter to page the employee. A response indicator detects when the employee has responded to the page. For example, the image recognition program may detect when the employee has entered a zone for greeting customers, and report to the controller that the employee has entered the greeting zone. In response, the controller obtains from the timer, an elapsed greeting time between the time the vehicle entered the parking space and the time the employee entered the greeting zone, and prepares a management report that includes the elapsed greeting time.

The image recognition program may also detect and report to the controller that the vehicle has left the parking space. In response, the controller obtains from the timer, an elapsed service time between the time the vehicle entered the parking space and the time the vehicle left the parking space, and prepares a management report that includes the elapsed service time.

In yet another aspect, the present invention is directed to a method of managing a surveillance area. The method includes the steps of monitoring the surveillance area with a video camera; sending video from the video camera to an image recognition program, which is adapted to detect changes in the video image meeting predefined criteria for a triggering event; detecting by the program that a triggering event has occurred in the surveillance area; and alerting an individual in response to detecting that the triggering event has occurred. The step of monitoring the surveillance area may include monitoring a takeout parking space at a restaurant with the video camera, and the step of detecting that a triggering event has occurred may include detecting when a vehicle has entered the parking space. In this case, an employee responsible for serving takeout customers may be alerted.

The method may also include determining an elapsed greeting time between the time the vehicle entered the parking space and the time the employee entered the greeting zone. If a maximum allowable greeting time is exceeded, another employee or a manager may be alerted. The method may also include determining a total elapsed service time between the time the vehicle entered the parking space and the time the vehicle left the parking space. If a maximum allowable total service time is exceeded, a manager may be alerted.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

The present invention is an on-premises surveillance and paging system, which monitors a surveillance area and automatically pages an individual when a triggering event occurs in the monitored area. In the preferred embodiment of the present invention, the surveillance area includes one or more parking spaces for takeout customers at a restaurant. The parking spaces are monitored by a video camera, which is attached to a Change Recognition Function. When the Change Recognition Function detects that a car has entered one of the takeout parking spaces, the system preferably pages a restaurant employee using an on-premises paging system. They restaurant employee may then meet the takeout customer at the customer's car and take the customer's order without delays, and without requiring the customer to leave his car or enter the restaurant.

Figure 1:
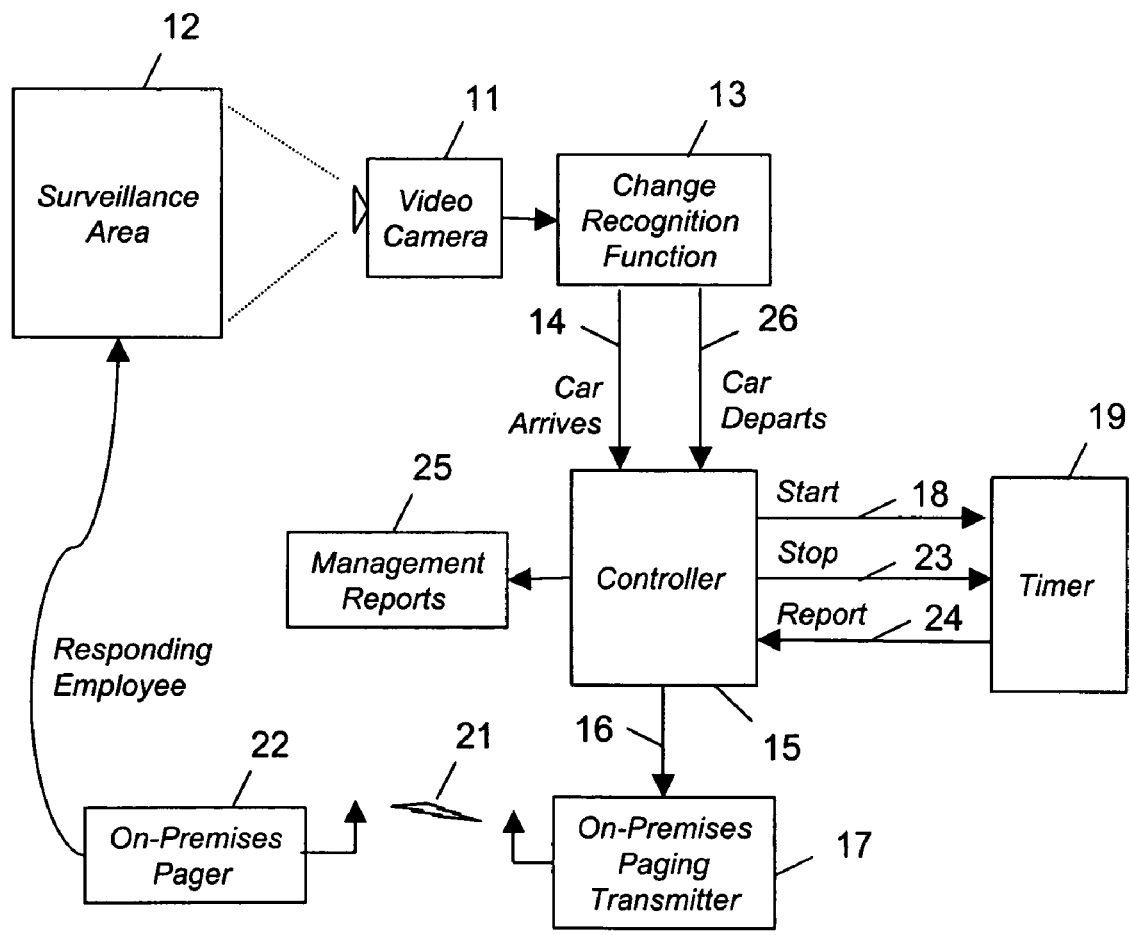
FIG. 1 is a simplified block diagram of an exemplary embodiment of the system of the present invention.

FIG. 1 is a simplified block diagram of an exemplary embodiment of the system of the present invention. A video camera 11 monitors a surveillance area 12, which includes at least one parking place for takeout customers. Video information from the video camera is supplied to a Change Recognition Function 13, which compares each frame of the video information with the previous frame to determine whether a change has occurred. The Change Recognition Function is adapted to differentiate between a change that is not a triggering event, such as a car driving by or a person walking through the parking space, and a triggering event such as the arrival and parking of a vehicle in one of the takeout parking places.

The Change Recognition Function 13 sends an indication 14 to a controller 15 indicating that a car has arrived in one of the takeout parking places. The controller 15 preferably sends a command 16 to an on-premises paging transmitter 17 instructing the transmitter to page an employee responsible for serving takeout customers. Other alerting mechanisms such as visual or audio mechanisms for alerting the employee of the presence of the takeout customer may also be used, either in addition to the pager or in place of the pager. For example, the controller 15 may send a command to illuminate a lighted number board, which displays parking place numbers associated with the takeout parking places when cars arrive. The number board may be utilized instead of, or in addition to, the on-premises pager. Alternatively, a light may be flashed or an audio announcement may be made, for example in a takeout service area, to alert the employee that a takeout customer is present.

At the same time the controller 15 alerts the employee, the controller may also send a start command 18 to a timer 19. The timer is used to keep track of how long it takes the employee to greet the customer as well as the total time that the customer's car remains in the takeout parking place. The operation of the timer is discussed in more detail below.

The on-premises paging transmitter 17 transmits a page 21 to an on-premises pager 22 carried by the employee responsible for serving takeout customers. The employee responds by going to the customer's car in the surveillance area and greeting the customer. The employee may push a button on a touch screen monitor, a keyboard, or a confirming transmitter to indicate to the controller 15 that the customer has been greeted. The controller then sends a stop signal 23 to the timer 19. Alternatively, one portion of the surveillance area may be designated as an "auto-greet" zone. When the greeting employee walks through the auto-greet zone, this event is detected by the video camera 11 and the Change Recognition Function 13. The Change Recognition Function notifies the controller 15 that the employee has greeted the car, and the controller sends the stop signal 23 to the timer 19. The timer sends a report 24 of the elapsed greeting time to the controller, and the elapsed greeting time is included in a set of management reports 25.

The timer 19 may be programmed with a maximum threshold greeting time. If the employee responsible for serving takeout customers does not enter the auto-greet zone or otherwise acknowledge the page within the maximum threshold greeting time, this fact may be reported to the controller 15, which may then instruct the on-premises paging transmitter 17 to page a different employee or a manager.

The timer 19 may also be programmed with a maximum allowable total service time. If a takeout customer's car remains in the takeout parking place for too long, this fact may be reported to the controller 15, which may then instruct the on-premises paging transmitter 17 to page the manager.

After the takeout customer is served and the car leaves the surveillance area 12, the Change Recognition Function sends an indication 26 to the controller 15, indicating that the car has departed. The controller sends another stop command 23 to the timer 19, which reports the total elapsed time that the car was in the takeout parking place. This information is also included in the management reports 25.

Figure 2:
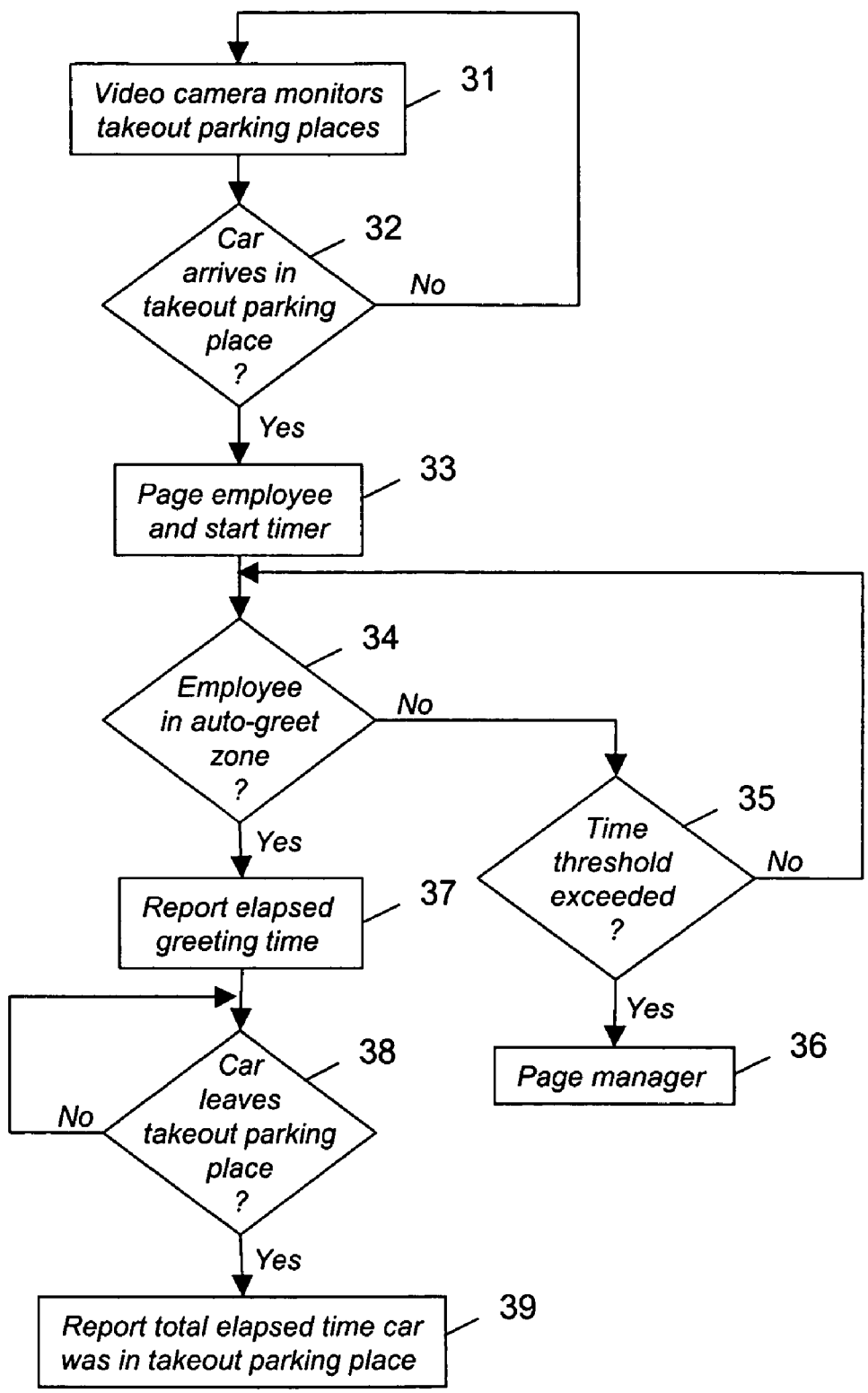
FIG. 2 is a flow chart of an exemplary embodiment of the method of the present invention.

FIG. 2 is a flow chart of an exemplary embodiment of the method of the present invention. At step 31, the video camera 11 monitors the takeout the parking places. At step 32, it is determined whether a car has arrived in one of the takeout parking places. If not, the process returns to step 31 and continues to monitor the takeout parking places. If it is determined that a car has arrived in a takeout parking place, the process moves to step 33, where the on-premises paging transmitter 17 pages the employee responsible for serving takeout customers. Simultaneously, the controller 15 starts the timer 19. At step 34, it is determined whether the employee has entered the auto-greet the zone. If not, the process moves to step 35 where it is determined whether a time threshold has been exceeded. If not the process returns to step 34 and continues to monitor the auto greet zone to determine when the employee arrives. If the time threshold has been exceeded (i.e., it has taken the employee too long to greet the takeout customer), the process moves to step 36 where the on-premises paging transmitter pages another employee or the restaurant manager.

When it is determined that the employee has arrived in the auto-greet zone, the process moves to step 37, where the elapsed greeting time is reported. Thereafter, the video camera 11 continues to monitor the takeout parking places to determine when the car leaves. At step 38, it is determined whether the car has left the takeout parking place. If not, the process continues to monitor the space. If the maximum allowable total service time is exceeded, the process may page the manager. When the car leaves the space, the process moves to step 39 where the total elapsed time that the car was in the takeout parking place is reported.

It is thus believed that the operation and construction of the present invention will be apparent from the foregoing description. While the system and apparatus shown and described has been characterized as being preferred, it will be readily apparent that various changes and modifications could be made therein without departing from the scope of the invention as defined in the following claims.

What is claimed is:

1. A combination surveillance and paging system, comprising:
   means for monitoring a surveillance area, said surveillance area including a parking space at a business establishment;
   means connected to the monitoring means for detecting that a vehicle has entered the parking space;
   means responsive to the detecting means for alerting an employee responsible for serving customers that the vehicle has entered the parking space;
   a timer;
   a controller connected to the detecting means, the alerting means, and the timer; and
   means for reporting to the controller that the employee has responded to the alerting means.

2. The combination surveillance and paging system according to claim 1, wherein the alerting means is an on-premises paging system comprising:
   an on-premises paging transmitter; and
   an on-premises pager carried by the employee, said pager operable only with the on-premises paging transmitter.

3. The combination surveillance and paging system according to claim 1, wherein the alerting means is a visual mechanism for alerting the employee that the vehicle has entered the parking space.

4. The combination surveillance and paging system according to claim 1, wherein the alerting means is an audio mechanism for alerting the employee that the vehicle has entered the parking space.

5. The combination surveillance and paging system according to claim 1, wherein the monitoring means includes a video camera that generates a video image of the surveillance area, and the detecting means is a change-recognition algorithm adapted to determine when a predefined change has occurred to the video image.

6. The combination surveillance and paging system according to claim 1, wherein:
the timer is adapted to measure an elapsed time between the time the vehicle entered the parking place and the time the employee responded to the alerting means; and
wherein the controller is further adapted to cause the alerting means to alert another individual if the employee does not respond within a maximum allowable response time.

7. The combination surveillance and paging system, according to claim 6, wherein:
the timer is further adapted to measure a total elapsed service time that the vehicle remains in the parking place; and
the controller is further adapted to cause the alerting means to alert a manager if the total elapsed service time exceeds a maximum allowable total service time.

8. The combination surveillance and paging system according to claim 7, wherein the controller is further adapted to prepare a report comprising the elapsed response time and the total elapsed service time.

9. The combination surveillance and paging system according to claim 1, wherein the means for reporting to the controller that the employee has responded to the alerting means includes an acknowledgment button on an input device in communication with the controller.

10. The combination surveillance and paging system according to claim 1, wherein the means for reporting to the controller that the employee has responded to the alerting means includes a monitored greeting zone within the surveillance area for greeting customers;
wherein the detecting means is further operable to detect when the employee enters the greeting zone, and to report to the controller that the employee has entered the greeting zone; and
wherein the controller is further adapted to obtain from the timer, an elapsed greeting time between the time the vehicle entered the parking space and the time the employee entered the greeting zone.

11. The combination surveillance and paging system according to claim 10, wherein:
the detecting means is further operable to detect when the vehicle leaves the parking space, and to report to the controller that the vehicle has left the parking space; and
the controller is further adapted to obtain from the timer, a total elapsed service time between the time the vehicle entered the parking space and the time the vehicle left the parking space, and to prepare a report comprising the total elapsed service time.

12. The combination surveillance and paging system according to claim 11, wherein the business establishment is a restaurant, and the monitoring means is operable to monitor a parking space for takeout customers.

13. A combination surveillance and paging system in a restaurant that serves takeout customers, comprising:
a video camera for monitoring a parking space for the takeout customers;
an image recognition program connected to the video camera for detecting that a vehicle has entered the parking space;
an on-premises paging transmitter for paging an employee in response to detecting that the vehicle has entered the parking space;
a timer; and
a controller connected to the image recognition program, the paging transmitter, and the timer;
wherein the image recognition program is operable to report to the controller that a vehicle has entered the parking space, and the controller is adapted to start the timer and instruct the paging transmitter to page the employee;
wherein the image recognition program is further operable to detect when the employee enters a zone for greeting customers, and to report to the controller that the employee has entered the greeting zone; and
wherein the controller is further adapted to obtain from the timer, an elapsed greeting time between the time the vehicle entered the parking space and the time the employee entered the greeting zone, and to prepare a report comprising the elapsed greeting time.

14. The combination surveillance and paging system according to claim 13, wherein:
the image recognition program is further operable to detect when the vehicle leaves the parking space, and to report to the controller that the vehicle has left the parking space; and
the controller is further adapted to obtain from the timer, a total elapsed service time between the time the vehicle entered the parking space and the time the vehicle left the parking space, and to prepare a report comprising the total elapsed service time.

15. A method of managing a surveillance area, comprising the steps of:
monitoring the surveillance area with a video camera, wherein the surveillance area includes a takeout parking space at a restaurant;
sending video from the video camera to an image recognition program, said program being adapted to detect changes in the video image meeting predefined criteria that indicate when a vehicle has entered the parking space;
detecting by the program that a vehicle has entered the parking space;
alerting an employee responsible for serving takeout customers in response to detecting that the vehicle has entered the parking space;
starting a timer when the vehicle enters the parking space;
detecting when the employee responds to the alerting step; and
reporting an elapsed greeting time between the time the vehicle entered the parking space and the time the employee responded to the alerting step.

16. The method according to claim 15, wherein the step of alerting includes paging the employee utilizing an on-premises paging transmitter and an on-premises pager carried by the employee, said pager operable only with the on-premises paging transmitter.

17. The method according to claim 15, further comprising the steps of:
detecting when the vehicle leaves the parking space; and
reporting an elapsed service time between the time the vehicle entered the parking space and the time the vehicle left the parking space.

18. The method according to claim 15, further comprising the steps of:

determining that the employee has not responded to the alerting step within a maximum allowable response time; and alerting another individual that the employee has not responded to the alerting step within the maximum allowable response time.

19. The method according to claim 15, further comprising the steps of:

determining that the vehicle has remained in the parking place for longer than a maximum allowable total service time; and alerting a manager that the total elapsed service time has exceeded the maximum allowable total service time.

* * * * *